3,400,139
SULFIDES OF HIGHER FATTY ACIDS

George M. Calhoun, Cleveland, Ohio, assignor to Shell Oil Company, New York, N.Y., a corporation of Delaware
No Drawing. Original application July 3, 1959, Ser. No. 824,796, now Patent No. 3,189,547, dated June 15, 1965. Divided and this application Feb. 3, 1965, Ser. No. 430,197
8 Claims. (Cl. 260—399)

ABSTRACT OF THE DISCLOSURE

Novel oil soluble dithioethers of an ester of a diol, such as polyethylene glycol and 2,2'-thiodiethanol, and a fatty acid such as oleic acid are excellent lubricating oil additives.

---

This patent application is a division of copending patent application, Ser. No. 824,796, now U.S. Patent 3,189,547, issued June 15, 1965, filed July 3, 1959.

The invention relates to a new and novel class of oil-soluble complex polythioether-ester compounds.

The oil-soluble compounds of the present invention are particularly useful as improving agents for lubricating oil compositions and are obtained by reacting (a) esters of a long chain unsaturated fatty acide, RCOOH, where R is 18 or more carbon atoms, and polyoxyalkylene diols or their thio derivatives having the formula

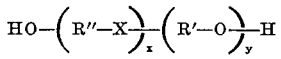

where R' and R" are the same or different akyl radicals or from 2 to 8, preferably 2 to 3 carbon atoms, X is oxygen or sulfur and $x$ and $y$ are integers of at least 1, preferably 1 to 6 with (b) mercapto compounds such as a mercapto acid, alcohol, ether or ester so that the end product has at least 1 and preferably 2 thioether radicals

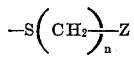

where Z is —OR''' or —COOR''' and the R''' is hydrogen or a $C_{1-4}$ alkyl radical and $n$ is an integer of from 1 to 4, preferably 1. The maximum number of

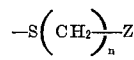

units in the final compound depends on the degree of unsaturation of the intermediate ether-ester. The unsaturated fatty acid ester of the polyoxyalkylene glycol may be represented by the formula

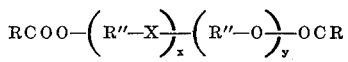

and the thioether thereof by the formula

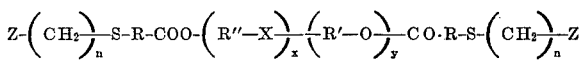

The intermediate ether-esters are prepared by esterifying a long chain unsaturated fatty acid such as oleic acid, linoleic acid, linolenic acid, erucic acid, ricinoleic acid and the like with a polyoxyalkylene diol or the thio derivatives thereof, such as diethylene glycol, triethylene glycol, tetraethylene glycol, dipropylene glycol, tripropylene glycol, dibutylene glycol, 2,2'-thiodienthanol, 3,3'-thiodipropanol, and the like. Esters of these materials include diethylene glycol dioleate, triethylene dioleate, dipropylene glycol dioleate, diethylene glycol linoleate, tetraethylene glycol ricinoleate, dibutylene glycol oleate, 2,2'-thiodiethanol dioleate, 2,2'-thiodiethanol diricinoleate, 2,2'-thiodiethanol linoleate and the like.

Compounds of the present invention are prepared by reacting the ether-ester with a mercapto compound such as mercapto aliphatic carboxylic acids, e.g., mercaptoacetic acid, mercaptopropionic acid, mercaptobutyric acid, or mercapto-alkanols such as 2-mercaptoethanol, 2- and 3-mercaptopropanol, 2-, 3-, and 4-mercaptobutanol or ethers of said mercaptoalcohols such as methyl or octyl 2-mercaptoethanyl or mercapto esters, e.g., ethyl mercaptoacetate or ethyl mercaptobutyrate, and mixtures thereof.

The additives can be prepared by the methods described by Koenig et al. JACS 79,362 (1957) or Fitzgerald Jr. Org. Chem. 22,197 (1957) and preferably at low temperatures, from room temperature to about 50° C., in the presence of a free radical catalyst such as azo or peroxide catalysts or ultraviolet light and a nonreactive solvent such as benzene, toluene, xylene, or the like. Suitable initiators include various free radical-yielding, heterocyclic and alicyclic peroxides, such as diethyl peroxide, tertiary butyl hydroperoxide, dibenzoyl peroxide, ditertbutyl peroxide, dimethylthienyl peroxide, dicyclohexyl peroxide, dilauroyl peroxide and urea peroxide. These are mentioned by way of non-limiting examples of suitable organic peroxides. Other initiating compounds known include emulsion redox systems, such as a mixture of sodium bisulfite and persulfate, ammonium persulfate, alkali metal perborates, azo compounds, such as alpha, alpha-azodiisobutyronitrile, etc.

The following examples illustrate the preparation of suitable additives for use in accordance with the present invention.

EXAMPLE I

About 600 grams of diethylene glycol dioleate and 223.5 grams of mercaptoacetic acid were mixed in a flask at 20–25° C. About 240 drops (30 drops at a time) of t-butyl hydroperoxide were added over a period of 2 hours and the temperature was kept at about 37° C. The reaction mixture was diluted with 2 volumes of diethyl ether, washed with 12 liters of water to pH 4, dried over $Na_2SO_4$, filtered and the solvent stripped at 155° C. and 2 mm. pressure. The final product was a mixture of the 9- and the 10-carboxymethylmercaptostearate diesters of diethylene glycol.

EXAMPLE II

About 600 grams of triethylene glycol dioleate and 223.5 grams of mercaptoacetic acid were mixed in a flask at 20–25° C. About 240 (30 drops at a time) of t-butyl hydroperoxide were added over a period of 2 hours and the temperature was kept at about 37° C. The reaction mixture was diluted with 2 volumes of diethyl ether, washed with 12 liters of water to pH 4, dried over $Na_2SO_4$, filtered and the solvent stripped at 155° C. and 2 mm. pressure. The final product was a mixture of the 9- and 10-carboxymethylmercaptostearate diesters of triethylene glycol.

EXAMPLE III

About 600 grams of diethylene glycol in ricinoleate and 223.5 grams of mercaptoacetic acid were mixed in a flask of 20–25° C. About 240 drops (30 drops at a time) of t-butyl hydroperoxide were added over a period of 2 hours and the temperature was kept at about 37° C. The reaction mixture was diluted with 2 volumes of diethyl ether, washed with 12 liters of water to pH 4, dried over $Na_2SO_4$, filtered and the solvent stripped at 155° C., and 2 mm. pressure. The final product was a mixture of the 9- and 10-carboxylmethylmercapto-12-hydroxylstearate diester of diethylene glycol.

EXAMPLE IV

About 600 grams of diethylene glycol dioleate and 223.5 grams of mercaptoethanol were mixed in a flask at 20–25° C. About 240 drops (30 drops at a time) of t-butyl hydroperoxide were added over a period of 2 hours and the temperature was kept at about 37° C. The reaction mixture was diluted with 2 volumes of diethyl ether, washed with 12 liters of water to pH 4, dried over $Na_2SO_4$ filtered and the solvent stripped at 155° C. and 12 mm. pressure. The final product was a mixture of diethylene glycol di(9-[and 10-2-hydroxyethylmercapto]-stearate).

EXAMPLE V

About 600 grams of 2,2'-thiodiethanol dioleate and 223.5 grams of mercaptoacetic acid were mixed in a flask at 20-25° C. About 240 drops (30 drops at a time) of t-butyl hydroperoxide were added over a period of 2 hours and the temperature was kept at about 37° C. The reaction mixture was diluted with 2 volumes of diethyl ether, washed with 12 liters of water to pH 4, dried over $Na_2SO_4$, filtered and the solvent stripped at 155° C. and 2 mm. pressure. The final product was a mixture of 2,2'-thiodiethanol di(9- and 10-carboxymethylmercaptostearate).

The mercapto-modified polyether-esters are oil-soluble and can be used in lubricating oils and oil compositions in amounts of from about 0.5% to about 20%, preferably from about 1% to about 5% by weight.

Lubricating oils in which the additives of this invention can be used include one or more of a variety of synthetic oils, e.g., di-2-ethyl-hexylsebacate or copolymers of polyalkylene oxide and alkylene glycol or natural hydrocarbon oils having a viscosity range of from 50 SUS at 100° F. to 250 SUS at 210° F. (SAE viscosity number ranging from SAE 10W to SAE 90).

Suitable oils are the gas turbine lube oils having the following properties:

| Grade | 1010 | 1065 |
| --- | --- | --- |
| Flash, COC, ° F | 300 | 465 |
| Pour, ° F | −10 | 0 |
| Viscosity, SUS at 100° F | 59.4 | 530 |
| Neutral Number | 0.02 | 0.01 |
| Ash | None | None |

The following compositions are illustrative of the invention, the percentages being by weight.

Composition A: Percent
   Example I additive _____ 2
   1010 mineral oil _____ Essentially balance
Composition B:
   Example II additive _____ 2
   1010 mineral oil _____ Essentially balance
Composition C:
   Example III additive _____ 2
   1010 mineral oil _____ Essentially balance
Composition D:
   Example IV additive _____ 2
   1010 mineral oil _____ Essentially balance
Composition E:
   Example II additive _____ 1
   SAE 30 mineral oil _____ Essentially balance
Composition F:
   Example V additive _____ 2
   SAE 90 mineral oil _____ Essentially balance
Composition G:
   Example I additive _____ 2
   Lauric acid _____ 2
   SAE 90 mineral oil _____ Essentially balance
Composition H:
   Example I additive _____ 5
   Polyethylene-propyleneglycol having a SUS at 100° F. of 660 _ Essentially balance
Composition I:
   Example I additive _____ 2
   Di-2-ethylhexylsebacate _____ Essentially balance Compositions of this invention were evaluated for their extreme pressure properties on a spur-gear machine. The machine consists essentially of two geometrically similar pairs of gears connected by two parallel shafts. The gear pairs are placed in separate gear boxes, which also contain the supporting ball bearings. One of the shafts consists of two sections connected by a coupling. Loading is accomplished by locking one side of the coupling and applying torque to the other. The conditions of the test were:

Speed _____r.p.m.___ 3200
Oil temperature _____° C___ 100
Oil flow-rate _____cc./sec__ 10
Load in increments 5 min. at each setting.

Results of the evaluations are given in Table I and for purpose of comparison, the results obtained from the use of the base oil alone and with other known extreme pressure compositions are also given.

TABLE I

| Composition | Score load, lbs./in² |
| --- | --- |
| A, B, C and E through I | 10,000–12,000 |
| 1010 mineral oil plus 2% $C_{16}$ alkenyl succinic acid | 1,400 |
| 1010 mineral oil plus 2% malonic acid | 2,800 |
| 1010 mineral oil plus 2% 3-hexadecyl adipic acid | 1,400 |
| 1010 mineral oil plus 2% dodecyl-mercaptosuccinic acid | 1,400 |
| 1010 mineral oil plus 10% glycerol monooleate | 1,800 |
| 1010 mineral oil plus 2% $C_{13}H_{27}OH$ ("OXO" process) | 600 |
| 1010 mineral oil | 600 |

The data show the outstanding enhancement of the load-carrying ability of the oil effected by the mercapto-containing compounds of the invention, as represented by those of Compositions A through I. On the other hand, malonic acid, succinic acid, 3-hexadecyl adipic acid and $C_{16}$-alkenyl succinic acid as well as sulfur-containing acids outside the scope used by applicant such as dodecyl-mercapto-succinic acid, or other types of esters and alcohols such as glycerol-monooleate, lauric acid or "OXO" alcohol effected only a slight improvement.

Compositions of the present invention were also tested for their corrosion and sludge resistant properties by the following methods: (1) a Timken 2126 steel bearing was immersed in a test composition and placed in an open air oven at 150° C. for 65 hours, and at the end of the test, the bearing examined and (2) steel rods (3/16" by 3") were immersed in test compositions for 21½ hours at 150° C. and the amount of sludge formed on the rods was noted as shown in Table II.

TABLE II

| Composition | 1 | 2 |
| --- | --- | --- |
| Composition A | No stain | 0.7 mg. sludge. |
| 1010 mineral oil plus 2% 3(2-ethyl-hexyl)adipic acid | Badly stained | 60 mg. sludge. |
| 1010 mineral oil plus 2% 9- and 10-carboxystearic acid | | 100 mg. sludge. |

The sulfur-containing compounds of this invention are useful also for providing superior load-carrying properties for lubricating oils which contain minor amounts of other agents, such as silicone anti-forming agents, alkylphenol anti-oxidants, polyacrylate ester viscosity-index improvers, long chain acids such as lauric and oleic acids as oiliness agents and the like.

I claim as my invention:
1. A compound of the formula

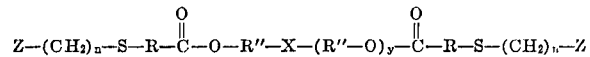

wherein X is oxygen or sulfur, R" is alkylene of 2 to 4 carbon atoms, y is an integer from 1 to 3 with the provision that when X is sulfur y is 1, R is selected from the group consisting of $C_{17}$ alkylene, $C_{17}$ hydroxy alkylene and $C_{17}$ alkenylene, n is an integer from 1 to 4 and Z is a member selected from the group consisting of —OR'''
and

wherein R''' is H or alkyl of 1 to 4 carbon atoms.

2. A compound according to claim 1 wherein X is oxygen.

3. A compound according to claim 2 wherein R''' is H and R is $C_{17}$ alkylene.

4. A compound according to claim 2 wherein R''' is H and R is $C_{17}$ hydroxyalkylene.

5. A compound according to claim 1 wherein X is sulfur, R'' is ethylene, R''' is H and R is $C_{17}$ alkylenes.

6.

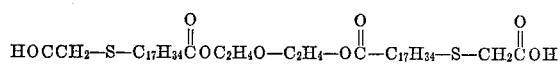

7. A member selected from the group consisting of

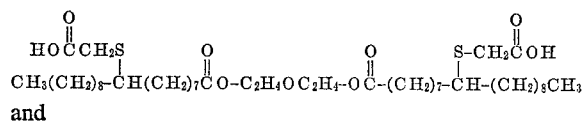
and

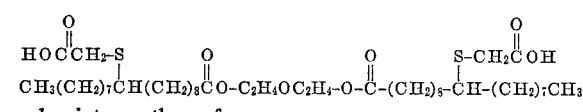
and mixtures thereof.

8. A member selected from the group consisting of

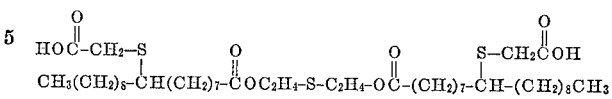

and

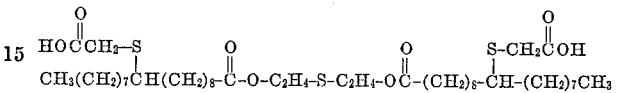

and mixtures thereof.

References Cited
UNITED STATES PATENTS

| | | | |
|---|---|---|---|
| 2,540,570 | 2/1951 | Cyphers | 260—399 X |
| 2,994,662 | 8/1961 | Calhoun et al. | 260—399 X |
| 3,041,284 | 6/1962 | Calhoun et al. | 260—399 X |
| 3,278,566 | 10/1966 | Calhoun et al. | 260—399 X |

NICHOLAS S. RIZZO, *Primary Examiner.*

J. H. TURNIPSEED, *Assistant Examiner.*